US008831362B1

(12) United States Patent
Steffens

(10) Patent No.: US 8,831,362 B1
(45) Date of Patent: *Sep. 9, 2014

(54) ESTIMATING AGE USING MULTIPLE CLASSIFIERS

(71) Applicant: Google Inc., Mountain View, CA (US)

(72) Inventor: Johannes Steffens, Westoverledingen (DE)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/938,299

(22) Filed: Jul. 10, 2013

Related U.S. Application Data

(63) Continuation of application No. 13/206,859, filed on Aug. 10, 2011, now Pat. No. 8,498,491.

(51) Int. Cl.
G06K 9/62 (2006.01)
G06K 9/00 (2006.01)

(52) U.S. Cl.
CPC .................. G06K 9/00288 (2013.01)
USPC ....................................... 382/224

(58) Field of Classification Search
USPC .................. 382/103, 118, 159, 224, 226–228
See application file for complete search history.

(56) References Cited

U.S. PATENT DOCUMENTS

| 7,319,779 | B1 | 1/2008 | Mummareddy et al. |
| 7,912,246 | B1 * | 3/2011 | Moon et al. .................... 382/103 |
| 2002/0078045 | A1 | 6/2002 | Dutta |
| 2010/0217743 | A1 | 8/2010 | Ueki |

OTHER PUBLICATIONS

Yan-Min Tang, Bao-Liang Lu, Age Classification Combining Contour and Texture Feature, In Proceedings of ICONIP (2) 2010, pp. 493-500.
Kim, E., et al., 'Combination of Multiple Classifiers for the Customer's Purchase Behavior Prediction,' Decision Support Systems 34 (2002) 167-175.
Office Action issued in U.S. Appl. No. 13/206,859 on Dec. 12, 2012, 17 pages.
Notice of Allowance issued in U.S. Appl. No. 13/206,859 on Mar. 27, 2013, 6 pages.

* cited by examiner

Primary Examiner — Daniel Mariam
(74) Attorney, Agent, or Firm — Fish & Richardson P.C.

(57) ABSTRACT

Methods, systems, and apparatus, including computer programs encoded on a computer storage medium, for performing age estimation. In one aspect, a method includes receiving an image of a person, submitting the image to multiple binary classifiers that are each trained to classify the person in the image as belonging to one of two predefined age groups, or as belonging or not belonging to a particular age group, where each output includes a confidence value associated with classifying the person in the image, obtaining the confidence values from the multiple binary classifiers, aggregating the confidence values, and generating an age estimation for the person in the image based on the aggregated confidence values.

22 Claims, 5 Drawing Sheets

ESTIMATING AGE USING MULTIPLE CLASSIFIERS

CROSS-REFERENCE TO RELATED APPLICATION

This application is a continuation of U.S. application Ser. No. 13/206,859, filed Aug. 10, 2011, the contents which is incorporated by reference.

BACKGROUND

The present specification relates to age estimation.

Visible facial aging is caused by various factors that predominate in different stages of life. Through early development, rapid changes occur through bone growth and tissue changes. During adulthood, facial appearance is fairly stable. Typical changes are driven by wrinkles and frown-lines from facial expressions. For the elderly, skin and tissue changes, such as hollowing of the cheeks and thinning of the lips drives changes in facial appearance.

Automated age estimation includes model-based and regression-based approaches. With model-based approaches, parameterized models can be generated to represent general facial changes during aging. Such models may then be fitted to sample images. Regression-based approaches use regressive learning on face sample data.

SUMMARY

According to one innovative aspect of the subject matter described in this specification, an image of a person is submitted to multiple classifiers, each with a scalar output suitable to determine a probability that the person is a member of a particular age group or not, or as a member of one age group or another. Such a classifier is referred to by this specification as a "binary classifier". The multiple binary classifiers each output a confidence value or score, which reflects the respective classifier's confidence in the classification. The confidence values from several of the binary classifiers are aggregated, (e.g. through combination and/or weighting), to generate an aggregated age estimate.

Another innovative aspect of the subject matter described in this specification, a process includes receiving an image of a person, and submitting the image to multiple binary classifiers that are each trained to classify the person in the image as belonging to one of two predefined age groups, or as belonging or not belonging to a particular age group, where each output includes a confidence value associated with classifying the person in the image. The process also includes obtaining the confidence values from the multiple binary classifiers, aggregating the confidence values, and generating an age estimation for the person in the image based on the aggregated confidence values.

Other embodiments of these aspects include corresponding systems, apparatus, and computer programs, configured to perform the actions of the methods, encoded on computer storage devices.

These and other embodiments may each optionally include one or more of the following features. For instance, the process may include transmitting a representation of the age estimation to a content-serving engine. The content-serving engine may be a search engine or a video-on-demand engine. Aggregating the confidence values may include weighting one or more of the confidence values. The predefined age groups are selected from an infant group, a toddler group, a preadolescent group, a young group, a middle-aged group, and an elderly group. Aggregating the confidence values may include collecting the confidence values into a low-dimensional vector; and inputting the low-dimensional vector to a regressor that maps the vector into a single scalar value. Aggregating the confidence values may include generating polynomic combinations of the confidence values. Submitting the image to multiple binary classifiers may include submitting the image to between five and fifteen multiple binary classifiers. The multiple classifiers may each output a discrete value indicating whether the person in the image belongs to one of two predefined age groups, or as belonging or not belonging to a particular age group, and a continuous confidence value.

Advantageous implementations may include one or more of the following features. Readily available mass data for binary classification may be used for evaluation of the image. The regression process may operate on low-dimension vectors, thus requiring less training data of the explicit-age type to achieve acceptable generality, relative to monolithic regressors. General binary classification may be efficiently realized, and age estimation may be performed quickly.

The details of one or more implementations are set forth in the accompanying drawings and the description below. Other potential features and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
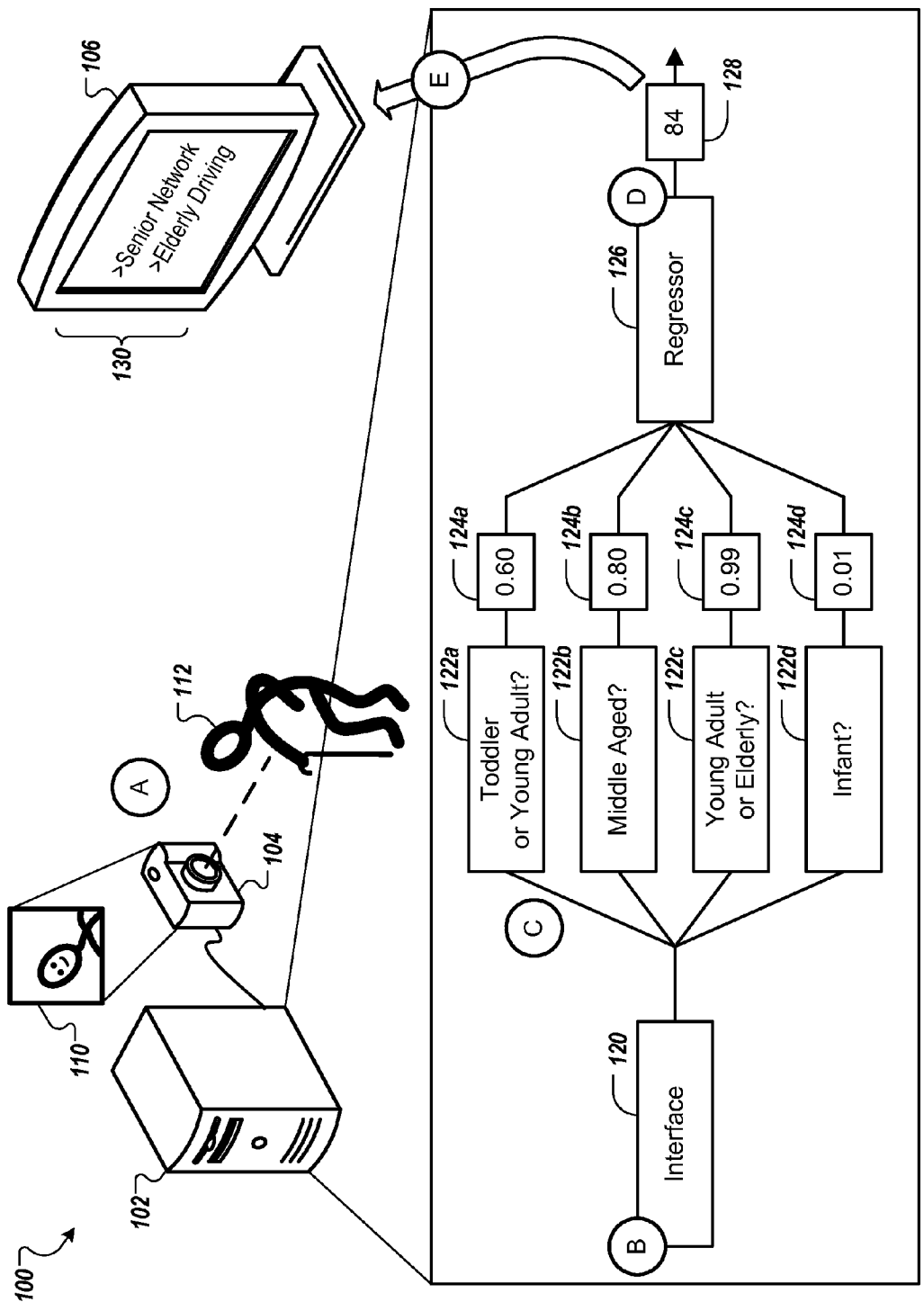
FIGS. 1 and 2 are diagrams of example systems that may estimate ages of individuals.

FIG. 1 is a diagram of an example system 100 that may estimate ages of individuals. FIG. 1 also illustrates an example flow of data, shown in states (A) to (E). States (A) to (E) may occur in the illustrated sequence, or they may occur in a sequence that is different than in the illustrated sequence.

In general, age estimation performed by the system 100 may be based on a hybrid of binary classification and regression techniques. For example, to estimate the age of an individual, the system 100 may receive an image of the individual and may provide the image to multiple binary classifiers executed by a computing device 102. Binary classifiers may be machine-learned by using ground truth data of two age groups (e.g., toddler vs. young adult, middle-aged vs. not middle aged, younger than a given age vs. older than a given age, etc.) Each binary classifier can discriminate between the two groups, for example, and can produce a continuous value (e.g., ranging from zero to one) reflecting a confidence that the individual in the image belongs to one of the two age groups vs. the other. The values from each of the multiple binary classifiers may be combined into a relatively low-dimensional vector on which a regressor can be applied, to estimate the age of the individual.

Age estimation information may be used for various purposes. For example, based on the estimated age of an individual, age-relevant content (e.g., text, audio, video, ads, etc.) may be provided to the individual by the system 100. As another example, results for search queries submitted by an individual may be based at least in part on the estimated age of the individual. For situations in which the systems discussed here collect personal information (e.g., images and/or ages) about individuals, the individuals may be provided with an opportunity to opt in/out of programs or features that may collect the personal information. In addition, certain data may be anonymized in one or more ways before it is stored or used, so that personally identifiable information is removed.

In further detail, the system 100 includes the computing device 102 in communication with an image collection device 104 (e.g., a digital camera). The computing device 102 includes one or more processors configured to execute instructions stored by a computer-readable medium for performing various device operations, such as input/output, communication, data processing, and the like. For example, the computing device 102 may include one or more client computing devices (e.g., desktop computers, laptop computers, notebook computers, smartphones, or other appropriate computing devices) and/or may include one or more servers (e.g., a backend server farm). Input received by a client computing device, for example, may be provided to a backend system (e.g., the cloud) for processing. As another example, processing may be distributed between one or more client computing devices (e.g., in a peer-to-peer configuration) and/or servers.

The image collection device 104 may collect still and/or video images of one or more individuals. Images collected by the image collection device 104 may be provided to the computing device 102, for example, using wired or wireless connection. For example, images may be provided using a communications cable, a wireless connection, a local area network, a wide area network, the Internet, or any appropriate combination thereof.

The system 100 includes a content presentation device 106. The content presentation device 106 may be in communication with the computing device 102, for example, and may present content to users based at least in part on age estimation information provided by the system 100. For example, the content presentation device 106 may be a display device (e.g., a monitor or display screen) of the computing device 102. As another example, the presentation device 106 may be a device such as an Internet-enabled television and may receive content (or links to content) from one or more backend systems associated with the computing device 102.

Referring to the example data flow, during state (A), the image collection device 104 collects an image 110 (e.g., a digital photograph) of an individual 112 (e.g., an elderly man) and provides the image 110 to the computing device 102. For example, the elderly man may use the computing device 102 to access a website which provides video content to users. In the present example, the computing device 102 can estimate the age of the man based on the image 110 and can provide the estimated age to the website. Based at least in part on the elderly man's estimated age, for example, suitable content may be selected by the website for presentation.

During state (B), the computing device 102 receives the image 110 via an interface 120. For example, the interface 120 can include an applications programming interface (API) for receiving images of various formats (e.g., .jpg, .gif, .bmp, .png, etc.) collected by various devices (e.g., digital cameras). As another possibility, the interface 120 can receive images retrieved from sources such as user profile pages of social networking websites or other suitable image sources. For example, the elderly man may have provided a profile photo to the video content website as part of an account registration process. The video content website may provide the photo to the interface 120, for example, to receive an estimate of elderly man's age.

During state (C), the interface 120 can submit the image 110 to multiple binary classifiers 122a-d for classification. Prior to receiving images for classification, for example, each of the binary classifiers 122a-d may have been trained (e.g., by using machine learning techniques such as decision trees and/or boosted cascades) using ground truth data of two different age groups. For example, a face detection framework (e.g., the Viola Jones Face Detector) may provide a basis for face classification by replacing the classification criterion "face vs. no face" with age group criterion (e.g., a member of a particular age group vs. a non-member, or a member of a particular age group vs. a member of another age group).

To generate ground truth data to be used for training, for example, images of many (e.g., thousands or millions of) different individuals can be labeled (e.g., by humans and/or computers) with indications of known or probable ages of the individuals depicted in the images, upon receiving permission from the depicted individuals for such image use. The images used for training may include different lighting conditions and subject poses, for example, reflecting real-world conditions. Learning algorithms used for training may include identifying primitive features (e.g., rectangular areas) included in the images, using boosting to combine features from multiple images, and growing classifiers which can discriminate between features associated with different classes.

In some implementations, the images may be sorted into various age groups for training. For example, images may be sorted into an infant group (e.g., ages 0-1), a toddler group (e.g., ages 1-3), a preadolescent group (e.g., ages 4-12), a young group (e.g., ages 13-40), a middle-aged group (e.g., ages 40-65), and an elderly group (e.g., ages 65+). The images may be further sorted into data sets used for training and testing. A percentage (e.g., about 60%) of the image data may be used for training, for example, with the remainder used for testing. Duplicate images may be removed so that training and testing data does not overlap.

Based on labeling and grouping of the training data, for example, appropriate image data may be used to train each of the classifiers 122a-d. In some implementations, classifiers may be trained to recognize and differentiate between members of non-adjacent age groups. For example, to train the classifier 122a ("Toddler or Young Adult?"), image data associated with the toddler group and image data associated with the young adult group may be used. One group may be designated as positive, and the other as negative. For example, the young adult group may be designated as positive, and the toddler group may be designated as negative. Thus, in the present example, a high confidence value produced by the classifier 122a may indicate a greater likelihood that an analyzed image is that of a young adult, than that of a toddler.

In some implementations, classifiers may be trained to recognize and differentiate between members of a particular age group and members of age groups other than the particular age group. For example, to train the classifier 122b ("Middle Aged?"), image data associated with the middle-aged group and image data associated with non-middle-aged groups may be used. The middle-aged group may be designated as positive, for example, and the non-middle-aged groups may be designated as negative. Thus, in the present example, a high confidence value produced by the classifier 122b may indicate a greater likelihood that an analyzed image is that of a middle-aged adult, than that of an individual of another age group.

In some implementations, classifiers may be trained to recognize and differentiate between members of adjacent age groups. For example, a classifier may be trained to distinguish between members of the middle-aged group and the elderly group, or between members of any other adjacent groups. In some implementations, classifiers may be trained to recognize and differentiate between individuals over a particular age threshold and individuals under the age threshold. For example, a classifier may be trained to distinguish between individuals over age 40 and individuals under age 40.

Each of the classifiers 122a-d in the present example can produce a continuous confidence value 124a-d that the image 110 depicts an individual of a particular age group. For example, the classifier 122a ("Toddler or Young Adult?") may produce the confidence value 124a (e.g., 0.60) that indicates a somewhat greater confidence that the individual 112 (e.g., the elderly man) is of the young adult group rather than the toddler group. However, based on a scale of zero (i.e., no confidence) to one (i.e., absolute confidence), the confidence value 124a (e.g., 0.60) may be considered as a relatively indeterminate confidence value. In contrast, the classifier 122c ("Young Adult or Elderly?") may produce the confidence value 124c (e.g., 0.99) that indicates a high confidence that the elderly man is of the elderly group rather than the young adult group. In the present example, the classifier 122b ("Middle Aged?") produces the confidence value 124b (e.g., 0.80) that the elderly man is of the middle-aged group, and the classifier 122d ("Infant?") produces the confidence value 124d (e.g., 0.01) that the man is of the infant group.

In some arrangements, more, fewer, or different classifiers (and/or different combinations of classifiers) may be used for producing confidence values. For example, classifiers may be used identify whether individuals depicted in images are likely to belong to each age group. As another example, classifiers may be used to identify whether individuals depicted in images are likely to belong to non-adjacent and/or adjacent age groups.

During state (D), the confidence values 124a-d can be aggregated and can be analyzed by a regressor 126 to produce an age estimate 128 (e.g., 84 years old) of the individual 112. For example, the regressor 126 may be configured to combine confidence values produced by the classifiers 122a-d into a low-dimensional vector, and may be trained to map the low-dimensional vector into a single scalar value used to produce age estimates. The regressor 126 can use least square fitting in an inflated feature space, for example, to produce age estimates. By performing regression on low-dimensional vectors, for example, processing times and the amount of training data for achieving acceptable generality may be reduced.

During state (E), content may be selected for presentation to the individual 112 (e.g., the elderly man), based at least in part on the age estimate 128 (e.g., 84 years old) produced by the regressor 126. In the present example, the website which provides video content to users may receive the age estimate 128, and may provide content 130 (e.g., "Senior Network", "Elderly Driving", etc.) suitable for presentation to the elderly man via the content presentation device 106.

Figure 2:
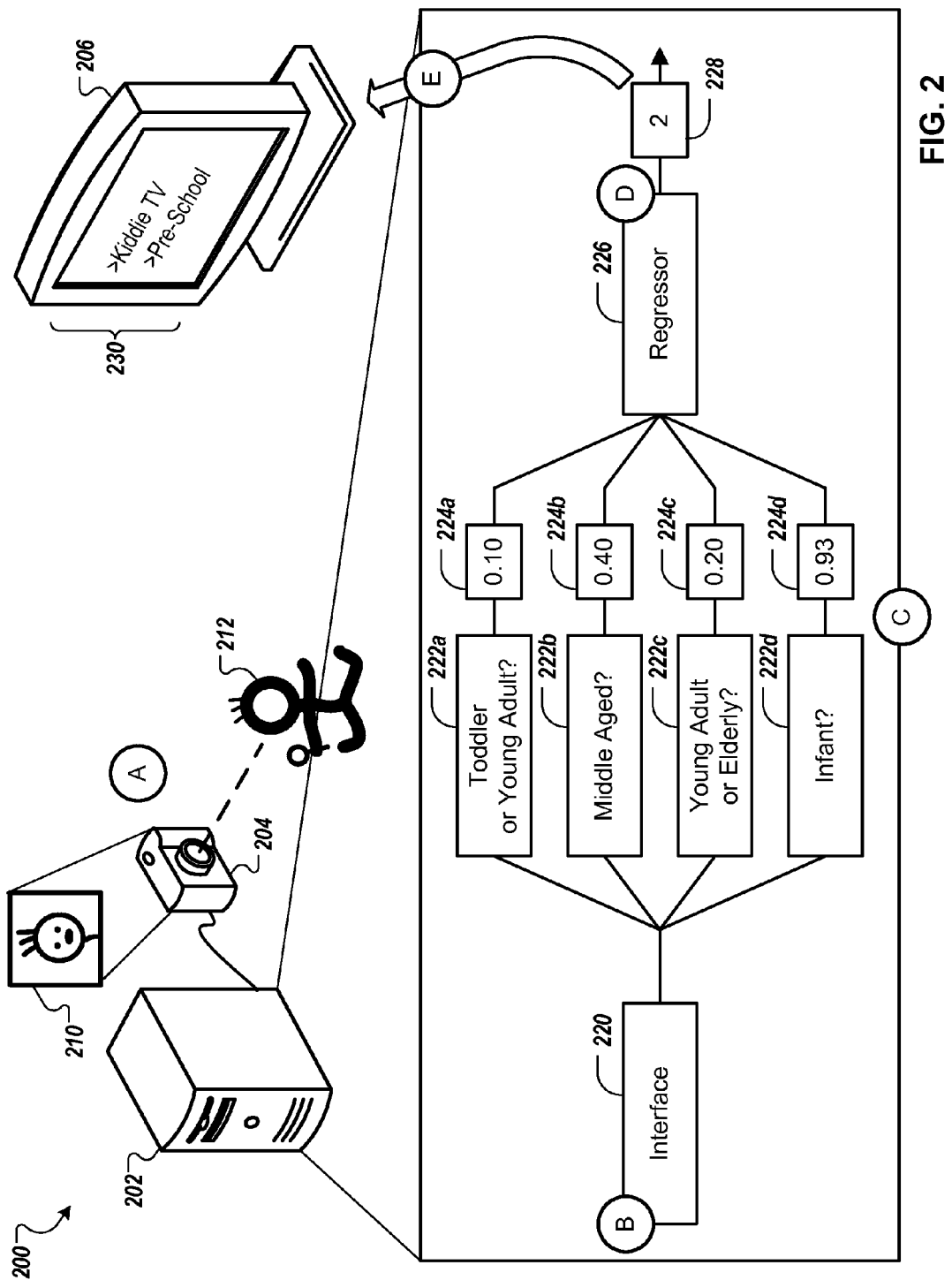

FIG. 2 is a diagram of an example system 200 that may estimate ages of individuals. FIG. 2 also illustrates an example flow of data, shown in states (A) to (E). States (A) to (E) may occur in the illustrated sequence, or they may occur in a sequence that is different than in the illustrated sequence. The system 200 includes various hardware components that may be similar to components of the system 100 (shown in FIG. 1). For example, the system 200 includes a computing device 202 (similar to the computing device 102), an image collection device 204 (similar to the image collection device 104), and a content presentation device 206 (similar to the content presentation device 106). Also, the computing device 202 may execute, manage, and/or interact with multiple software components that may be similar to components of the system 100. For example, the system 200 includes an interface 220 (similar to the interface 120), classifiers 222a-d (similar to the classifiers 122a-d), and a regressor 226 (similar to the regressor 126).

Referring to the example data flow, during state (A), the image collection device 204 collects an image 210 (e.g., a digital photograph) of an individual 212 (e.g., a toddler) and provides the image 210 to the computing device 202. For example, the toddler may be watching the content presentation device 206 (e.g., an Internet-enabled television) associated with the computing device 202. In the present example, the computing device 202 can estimate the age of the toddler based on the image 210 and can provide the estimated age to a content provider of the Internet-enabled television. Based at least in part on the toddler's estimated age, for example, suitable content may be selected by the content provider for presentation to the toddler.

During state (B), the computing device 202 receives the image 210 via the interface 220, and during state (C), the interface 220 can submit the image 210 to multiple binary classifiers 222a-d for classification. Each of the classifiers 222a-d in the present example can produce a continuous confidence value 224a-d that the image 210 depicts an individual of a particular age group. For example, the classifier 222a ("Toddler or Young Adult?") may produce the confidence value 224a (e.g., 0.10) that indicates a low confidence that the individual 212 (e.g., the toddler) is of the young adult group, and therefore a high confidence that the individual 212 is of the toddler group. Also, the classifier 222c ("Young Adult or Elderly?") may produce the confidence value 224c (e.g., 0.20) that indicates a low confidence that the toddler is of the elderly group rather than of the young adult group. In the present example, the classifier 222b ("Middle Aged?") produces the confidence value 224b (e.g., 0.40) that the toddler is of the middle-aged group, and the classifier 222d ("Infant?") produces the confidence value 224d (e.g., 0.93) that the toddler is of the infant group.

During state (D), the confidence values 224a-d can be aggregated and analyzed by the regressor 226 to produce an age estimate 228 (e.g., 2 years old) of the individual 212 (e.g., the toddler). During state (E), content may be selected for presentation to the individual 212, based at least in part on the age estimate 228 (e.g., 2 years old) of the individual. In the present example, the content server which provides video content to the content presentation device 206 (e.g., the Internet-enabled television) may receive the age estimate 228, and may provide content 230 (e.g., "Kiddie TV", "Pre-School", etc.) suitable for presentation to the toddler.

Thus, age-appropriate content may be provided to users based on user images. For example, if the system 200 determines that a current user of the content presentation device 206 is likely to be a toddler, content appropriate for toddlers may be provided to the device 206. As different users are identified by the system 200, different content may be provided. For example, if an adult user is identified as joining the toddler in viewing the content presentation device 206 (e.g., the image collection device 204 captures an image of both the toddler and an accompanying adult), family-oriented content may be provided.

Figure 3:
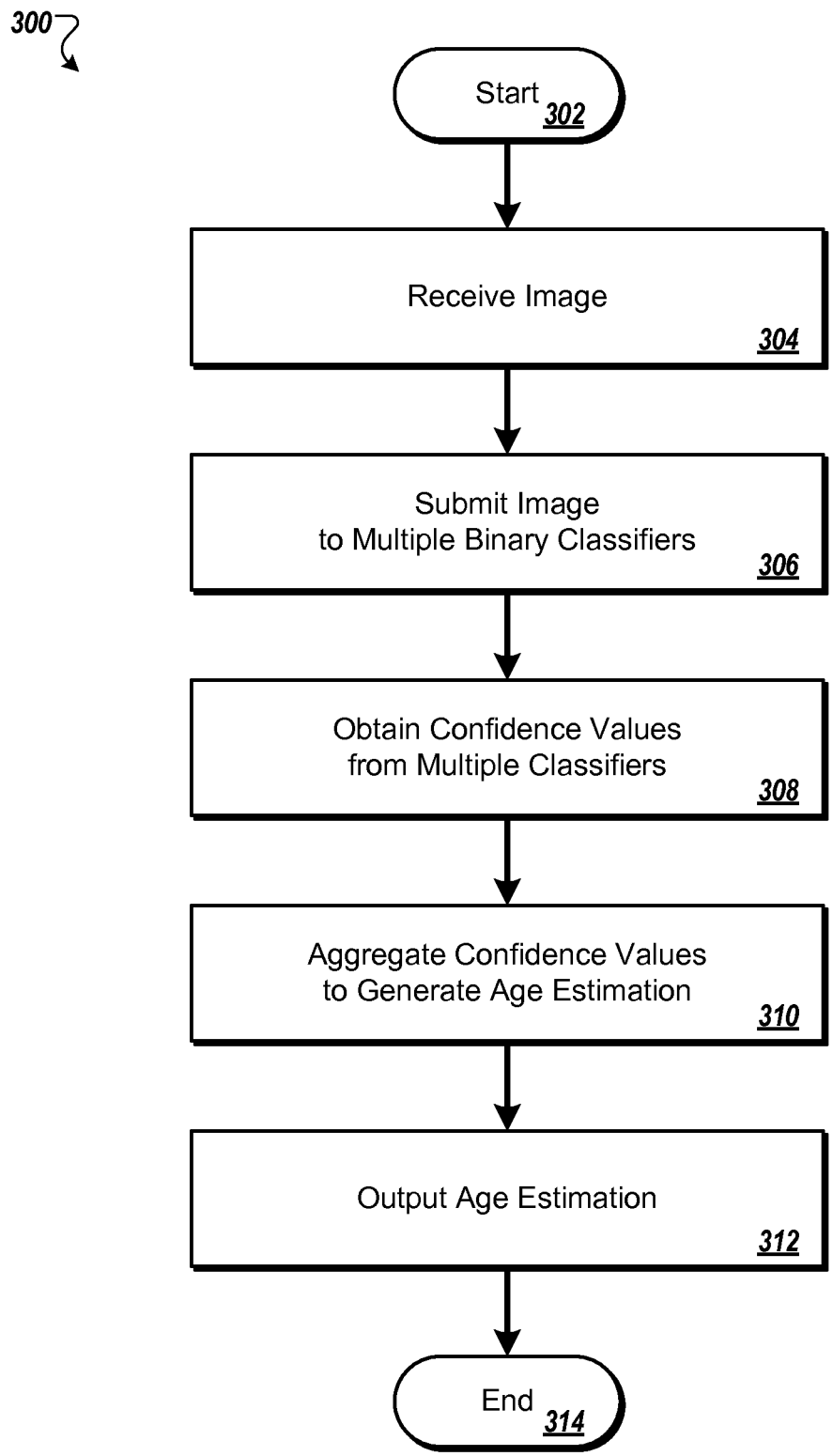
FIG. 3 is a flow chart illustrating an example process for estimating ages of individuals using multiple classifiers.

FIG. 3 is a flow chart illustrating an example process 300 for estimating ages of individuals using multiple classifiers. Briefly, the process 300 includes receiving an image, submitting the image to multiple binary classifiers, obtaining confidence values from the multiple classifiers, aggregating the confidence values to generate an age estimation, and outputting the age estimation.

In more detail, when the process 300 begins (302), an image is received (304). For example, the image may be a digital photograph of one or more subjects captured by a camera. As another example, the image may be generated from a segment of video. Image data may include various image file formats (e.g., .jpg, .gif, .bmp, .png, etc.), and may be received by one or more computing devices (e.g., computing devices 102 and 202, shown in FIGS. 1 and 2, respectively) for processing.

The received image is submitted (306) to multiple binary classifiers. For example, multiple binary classifiers may be trained to identify a subject included in an image as belonging to one or the other of two predefined age groups. Threshold ages for the age groups may be defined based on common demographic groupings or other appropriate criteria. For example, a binary classifier may be trained to identify individuals as being younger or older than a certain age (e.g., age 40). As another example, a binary classifier may be trained to identify individuals as being within a certain age range (e.g., between 25 and 40) or being outside of the age range (e.g., younger than 25 or older than 40). As another example, a binary classifier may be trained to identify individuals as possibly being within an age range (e.g., between 25 and 40) or within a different age range (e.g., between 55 and 70). Each of the binary classifiers may produce a continuous (e.g., between zero and one) confidence value that the subject included in the image belongs to one of the two predefined age groups, as opposed to belonging to the other.

Confidence values from the multiple classifiers are obtained (308) and are aggregated (310) to generate an age estimation. Although binary classifiers may be trained to distinguish between two classes, continuous confidence values output from the binary classifiers may reflect intermediate stages between classes. For example, a confidence value approaching zero or approaching one may be a strong indication that the subject included in the image should be classified as belonging to one group as opposed to another. A confidence value approaching 0.5, for example, may be an indication that classification between groups is indeterminate. The continuous confidence output from each of the multiple binary classifiers (e.g., both strong and indeterminate classification results) may be combined to produce a low-dimensional vector, for example, which may be mapped into a single scalar value using regression techniques to produce the age estimate.

In some implementations, aggregating confidence values may include weighting one or more of the confidence values. For example, confidence values from classifiers indicating a high probability that a subject belongs to a particular group (e.g., confidence values over or under a predetermined threshold) may be assigned a greater weight than indeterminate confidence values. As another example, confidence values from particular classifiers (e.g., a classifier used for determining whether a subject belongs to a particular group) may be assigned a greater weight than other classifiers. In some implementations, aggregating confidence values may include generating polynomic combinations of the confidence values. For example, confidence values from the classifiers can be combined or otherwise manipulated prior to mapping into a single scalar value by a regressor.

The age estimation is output (312), thereby ending the process (314). For example, the age estimation may be passed to other processes for serving content, or other potentially age-sensitive applications.

Figure 4:
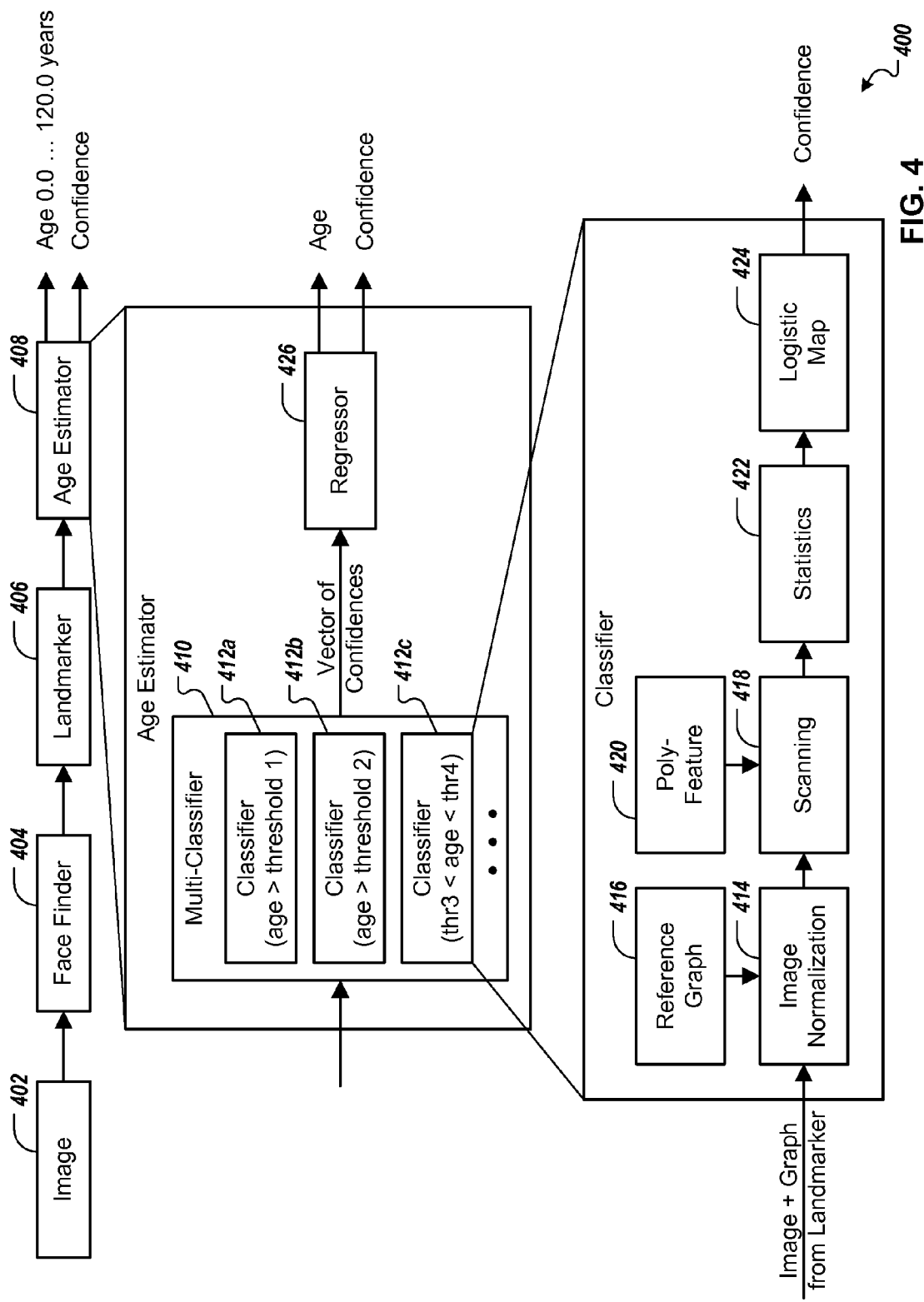
FIG. 4 is a block diagram of an example system for estimating ages of individuals using multiple classifiers.

FIG. 4 is a block diagram of an example system 400 for estimating ages of individuals using multiple classifiers. For example, the example system 400 may be implemented by one or more computing devices (e.g., computing devices 102 and 202, shown in FIGS. 1 and 2, respectively) as software and/or hardware components. FIG. 4 also illustrates an example flow of data through the system 400 as an image 402 is processed and the age of one or more individuals shown in the image 402 is estimated.

The image 402 can be processed by a face finder 404 to detect the faces of one or more individuals shown in the image 402. For example, the face finder 404 may determine the locations and sizes of faces in the image 402 by identifying patterns associated with various facial features (e.g., eyes, nose, mouth, etc.) The face finder 404 can provide information associated with the detected faces to a landmarker 406. The landmarker 406 may identify the positions and orientations of particular facial features (e.g., the eyes, the bridge and the base of the nose, etc.) The landmarker 406 can provide facial feature position and orientation information to the age estimator 408.

In the present example, the age estimator 408 includes a multi-classifier 410 which includes multiple binary classifiers 412a-c. For example, based on image and graph information provided by the landmarker 406, the classifier 412a can classify an individual shown in the image as being older or younger than a certain age (e.g., "threshold 1"). Based on similar image and graph information, for example, the classifier 412b can classify the individual as being older or younger than a different age (e.g., "threshold 2"), and the classifier 412c can classify the individual as being between within a certain age range (e.g., between "threshold 3" and "threshold 4") or outside of the range.

Each of the classifiers 412a-c may include components for performing binary classification. For example, upon receiving image and graph information from the landmarker 406, the classifier 412c can perform image normalization 414. For example, image normalization 414 may include rotating the face(s) detected in the image 402 to be upright, with a fixed eye distance. To facilitate image normalization, a reference graph 416 may be used. For example, the reference graph 416 may include a collection of coordinates defining a certain topology of the face, such as coordinates for the eyes, nose, and mouth.

Upon normalizing the image, for example, the classifier 412c can perform scanning 418. For example, scanning may include scanning a portion of the image (e.g., center and/or border positions) using one or more poly-features 420. For example, a poly-feature may represent multiple cascaded feature types trained to produce an improved cumulative discrimination relative to features trained in isolation. Based on scanning 418, for example, the classifier 412c may formulate a decision regarding classification of the face(s) detected in the image 402. Statistics 422 may be used by the classifier 412c, for example, to perform data averaging, and a logistic map 424 may be used to combine output of a sigmoid function, normalizing the value range from zero to one. The normalized value can be output by the classifier 412c, for example, as a confidence value associated with the individual being classified as belonging to a certain age group (e.g., having an age between "threshold 3" and "threshold 4").

A vector of confidences may be provided by the multi-classifier 410 to a regressor 426. Based on the provided vector (e.g., low-dimensional vector), the regressor 426 can perform least square fitting in an inflated feature space, to produce an age estimate of the individual (e.g., from zero to one hundred twenty years), and a confidence value associated with the estimate.

Figure 5:
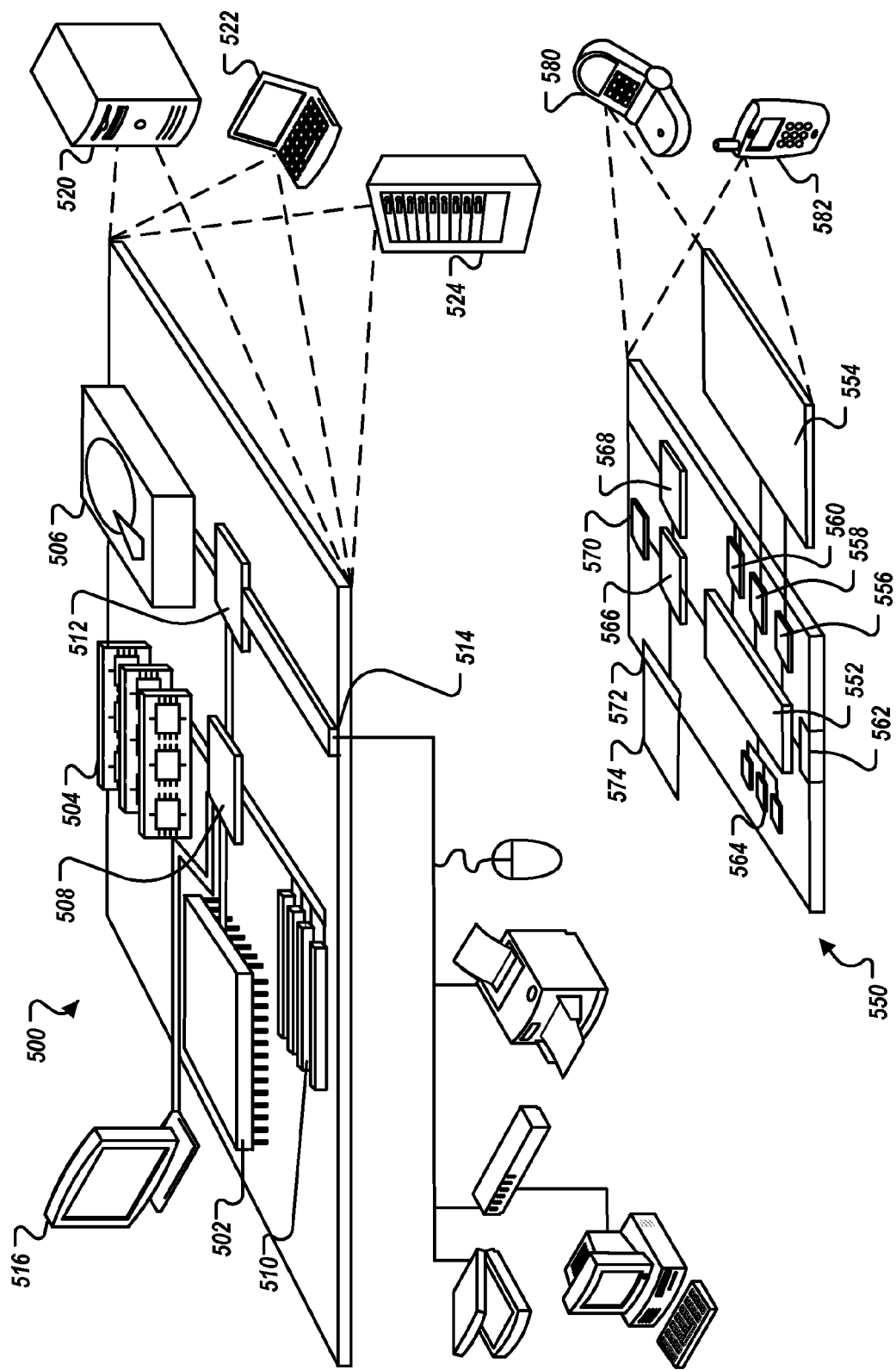
FIG. 5 shows an example of a generic computer device and a generic mobile computer device.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 may process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 may execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 may be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
receiving a representation of an object;
submitting the representation to multiple binary classifiers that are each trained to output (i) a result of classifying the object with respect to a particular characteristic, and (ii) a confidence value for the result, wherein the confidence value reflects a degree of confidence that the binary classifier has in the binary classifier's result of classifying the object with respect to the particular characteristic;
aggregating the confidence values that each reflect the degree of confidence that one of the multiple binary classifiers has in its result of classifying the object with respect to the particular characteristic; and
generating an estimated value for the object, with respect to the particular characteristic, based on the aggregated confidence values that each reflect the degree of confidence that one of the multiple binary classifiers has in its result of classifying the object with respect to the particular characteristic.

2. The method of claim 1, wherein the representation comprises an image or a video.

3. The method of claim 1, wherein the object comprises a portion of a human body.

4. The method of claim 1, wherein each classifier is trained to classify the object as belonging, or not belonging, to at least one of two or more predefined groups.

5. The method of claim 1, wherein each result comprises a scalar value.

6. The method of claim 1, wherein the particular characteristic comprises an age of the object.

7. The method of claim 1, wherein aggregating the confidence values comprises weighting one or more of the confidence values, and
wherein generating the estimated value for the object comprises generating the estimated value for the object based on the weighted confidence values.

8. The method of claim 1, wherein submitting the representation to the multiple binary classifiers comprises submitting the representation to multiple binary classifiers that each output:
a discrete value indicating whether the object belongs to one of two predefined groups, or whether the object belongs or does not belong to a particular group, and
a continuous confidence value.

9. The method of claim 1, wherein aggregating the confidence values comprises inputting the confidence values to a regressor that maps the vector to a scalar value; and
wherein generating an estimated value for the object, with respect to the particular characteristic, based on the aggregated confidence values comprises generating the estimate based at least in part on the scalar value.

10. The method of claim 1, wherein submitting the representation to multiple binary classifiers comprises submitting the representation to multiple binary classifiers that each output, as a confidence value, a number within a predetermined range.

11. The method of claim 1, wherein each of the multiple binary classifiers is configured to provide, as the result of classifying the object, data indicating whether or not the object belongs to a single group from a set of multiple mutually exclusive groups, and each of the multiple binary classifiers is configured to classify the object with respect to a different group from the set of multiple mutually exclusive groups.

12. A system comprising:
one or more computers; and
a computer-readable medium coupled to the one or more computers having instructions stored thereon which, when executed by the one or more computers, cause the one or more computers to perform operations comprising:
receiving a representation of an object;
submitting the representation to multiple binary classifiers that are each trained to output (i) a result of classifying the object with respect to a particular characteristic, and (ii) a confidence value for the result, wherein the confidence value reflects a degree of confidence that the binary classifier has in the binary classifier's result of classifying the object with respect to the particular characteristic;
aggregating the confidence values that each reflect the degree of confidence that one of the multiple binary classifiers has in its result of classifying the object with respect to the particular characteristic; and
generating an estimated value for the object, with respect to the particular characteristic, based on the aggregated confidence values that each reflect the degree of confidence that one of the multiple binary classifiers has in its result of classifying the object with respect to the particular characteristic.

13. The system of claim 12, wherein the representation comprises an image or a video.

14. The system of claim 12, wherein the object comprises a portion of a human body.

15. The system of claim 12, wherein each classifier is trained to classify the object as belonging, or not belonging, to at least one of two or more predefined groups.

16. The system of claim 12, wherein each result comprises a scalar value.

17. The system of claim 12, wherein the particular characteristic comprises an age of the object.

18. A non-transitory computer-readable medium storing software comprising instructions executable by one or more computers which, upon such execution, cause the one or more computers to perform operations comprising:
receiving a representation of an object;
submitting the representation to multiple binary classifiers that are each trained to output (i) a result of classifying the object with respect to a particular characteristic, and (ii) a confidence value for the result, wherein the confidence value reflects a degree of confidence that the binary classifier has in the binary classifier's result of classifying the object with respect to the particular characteristic;
aggregating the confidence values that each reflect the degree of confidence that one of the multiple binary classifiers has in its result of classifying the object with respect to the particular characteristic; and
generating an estimated value for the object, with respect to the particular characteristic, based on the aggregated confidence values that each reflect the degree of confidence that one of the multiple binary classifiers has in its result of classifying the object with respect to the particular characteristic.

19. The medium of claim 18, wherein the representation comprises an image or a video.

20. The medium of claim 18, wherein the object comprises a portion of a human body.

21. The medium of claim 18, wherein each classifier is trained to classify the object as belonging, or not belonging, to at least one of two or more predefined groups.

22. The medium of claim 18, wherein each result comprises a scalar value.

* * * * *